US005511291A

United States Patent [19]

Crawford

[11] Patent Number: 5,511,291

[45] Date of Patent: Apr. 30, 1996

[54] POWER BRAKE DESCENDER FOR RAPPELLING

[76] Inventor: Jeffrey W. Crawford, 10123 Loop Rd., Millersport, Ohio 43046

[21] Appl. No.: 286,962

[22] Filed: Aug. 8, 1994

[51] Int. Cl.$^{6}$ .............................. A63B 29/00; F16G 11/00

[52] U.S. Cl. .................. 24/129 R; 24/129 A; 24/115 M; 182/5

[58] Field of Search .............................. 24/129 R, 129 A, 24/129 B, 129 C, 115 G, 115 M; 182/5, 6, 10, 191, 236

[56] References Cited

U.S. PATENT DOCUMENTS

| | | | |
|---|---|---|---|
| 678,533 | 7/1901 | Bancker | 24/129 B |
| 785,019 | 3/1905 | Parker | 24/129 R |
| 2,386,836 | 10/1945 | Blagden | 24/129 R |
| 2,441,336 | 5/1948 | Sova | 24/129 R |
| 4,667,772 | 5/1987 | Kammerer | 24/115 M |
| 4,678,059 | 7/1987 | Bowker | 182/5 |
| 4,723,634 | 2/1988 | Fisk | 182/5 |
| 5,366,327 | 11/1994 | Nelson | 24/129 A |

FOREIGN PATENT DOCUMENTS

| | | | |
|---|---|---|---|
| 0507125 | 9/1920 | France | 24/129 R |

*Primary Examiner*—Victor N. Sakran

*Attorney, Agent, or Firm*—Frank H. Foster; Kremblas, Foster, Millard & Pollick

[57] ABSTRACT

A rappelling descender having an elongated, substantially hexagonal ring, a capstan attached to a first long side of the ring, and a hand grippable handle attached to a second long side of the ring, opposite the capstan. The hand grippable handle is at least substantially one palm width in length. A first ear extends from one side of the capstan, and a second ear extends from an opposite side of the capstan as the first ear, both ears extending transversely to the capstan.

16 Claims, 4 Drawing Sheets

POWER BRAKE DESCENDER FOR RAPPELLING

TECHNICAL FIELD

This invention relates to the field of rappelling tools, and more specifically to rappelling descenders through which a rope is wound and which is attached to the rappeller's waist belt or seating apparatus to slow the rappeller's descent.

BACKGROUND ART

In the sport of rappelling, a person equipped to rappell typically has a belt or a harness wrapped around or near his waist to which a rappelling descender is attached by a link called a carabiner. A rappelling descender is a device through which rope is passed, forming turns of rope around structures of the descender, each turn increasing the friction of the rope against the descender for slowing the descent of the rappeller.

Before beginning the descent, a person prepared to rappell weaves a series of turns of rope through the descender that will be maintained throughout the entire rappell, without change as to the number of turns or their placement. Once the rappeller begins the descent, he has committed himself to dropping at a given speed with a given amount of control over the speed. Dramatically slowing the speed of descent cannot usually be effected once the rappell has begun, which causes problems if the rappeller desires to slow down or stop.

Conventional descenders are shown throughout a book entitled *Rappelling, Edition II*, by Tom Martin, specifically on page 6–15, shown in FIG. 6-12. Descenders of the type shown in this illustration have a tendency to form a knot, as shown in FIG. 6-14, which causes the rappeller to suddenly stop his descent. The rappeller must attempt to either cut himself free from the rope or untie the knot in order to reach his destination.

In order to prevent knotting of the rope, descenders, such as those shown in FIG. 6-17, have been provided with ears projecting outwardly from opposite sides of the central opening of the descender. These ears prevent the rope turns from sliding together and knotting.

In FIGS. 6-54 through 6-57, another descender is illustrated which has ears for preventing knotting and also through which the rope may be wound to slow the descent. The orientation of this descender is difficult to predict due to the shape of the hole to which the carabiner is attached and through which the rope is wound. The ears of the descender are likely to be positioned anywhere from almost directly upward, as shown in FIG. 6-54, to nearly directly downward because the descender is not stable in any orientation. This makes it difficult to reliably loop the rope around the ears to slow the descent since the location of the ears varies during the descent.

Another descender is shown in FIG. 6-77, but this descender provides little access to wrapping the rope around the descender's ears. This is due to the orientation of the ears and their proximity to the taut overhead rope. It would be difficult to loop the loose rope coming out of the bottom of the descender around the ears, since the ends of the ears are so close to the overhead rope and the overhead rope would have to be moved to get past it to the ears.

Another descender is shown in FIGS. 6-118 through 6-120, which operates using the same principles as the descender shown in FIG. 6-54. The carabiner, which is the link connected between the descender and the rappeller's belt, takes a preferred position at the lower end of the descender, keeping the ears in a side orientation. The carabiner may interfere with the rope wound through the oval shaped loop, and wrapping the rope around the ears may be somewhat difficult due to the angle formed between the ears and the loop. This angle makes putting the rope between the ears and the loop a task requiring time and manipulation.

In U.S. Pat. No. 4,774,742 to Johnson, a descender is disclosed having a circular ring with a capstan extending from one side. The capstan has ears for preventing a rope from sliding off the capstan, and a secondary ring extends downwardly from the circular ring for attachment to the belt or carabiner. The descent of the rappell using Johnson's descender is controlled by wrapping the rope around the secondary ring attached to the belt. Wrapping the rope as required by Johnson requires the use of both hands as the rope is transferred from one side of the descender around the downwardly projecting secondary ring and back around to the side from which it came.

U.S. Pat. No. 3,678,543 to Hobbs discloses a descender having generally a "C" shape, with an extended loop beneath the "C" to which a carabiner is attached. The Hobbs device has rope wound through it in a conventional manner, but has a lower leg around which a loop of rope may be wound for slowing or stopping a descent. Hobbs' device requires a loop to be formed in the rope and looped over the lower leg, which is a maneuver that would be difficult during a descent, and in which the likelihood of failing is substantial.

U.S. Pat. No. 1,565,041 to Arney discloses an adjusting loop which can be used as a descender. As a descender, rope would be passed through the central loop and the end loop would be attached to the rappeller's belt with a carabiner. Rope coming through the central loop could be wound around the projections extending from the end opposite the carabiner to slow the rappeller's descent. Looping around these projections would be extremely difficult since the overhead, taut rope would inhibit this wrapping motion. Even if wrapping were possible, this would be a two-handed maneuver, which increases the danger involved.

U.S. Pat. No. 1,713,106 to Ulfers shows a rope lock which could be used as a descender. Due to the directions of the projections extending from the rope lock, this device would be extremely difficult to use as a descender, especially in terms of slowing the descent after beginning the rappell.

A descender is needed which permits a person using it to adjust the speed of his descent during the rappell in a quick, predictable, certain and safe manner. For rescue and military use especially, a descender is needed which can permit stopping of a rappell leaving both hands free for other uses, such as assisting the endangered person or handling a weapon.

BRIEF DISCLOSURE OF INVENTION

A rappelling descender is disclosed, comprising an elongated ring and a capstan attached to a first long side of the ring. A hand grippable handle extends from a second side of the ring, opposite the capstan. The handle extends at least substantially one palm width from the side of the ring from which it attaches.

In the preferred embodiment, a first ear extends from one side of the capstan and a second ear extends from an opposite side of the capstan. Both ears extend transversely to the capstan at an angle greater than 90°.

Figure 1:
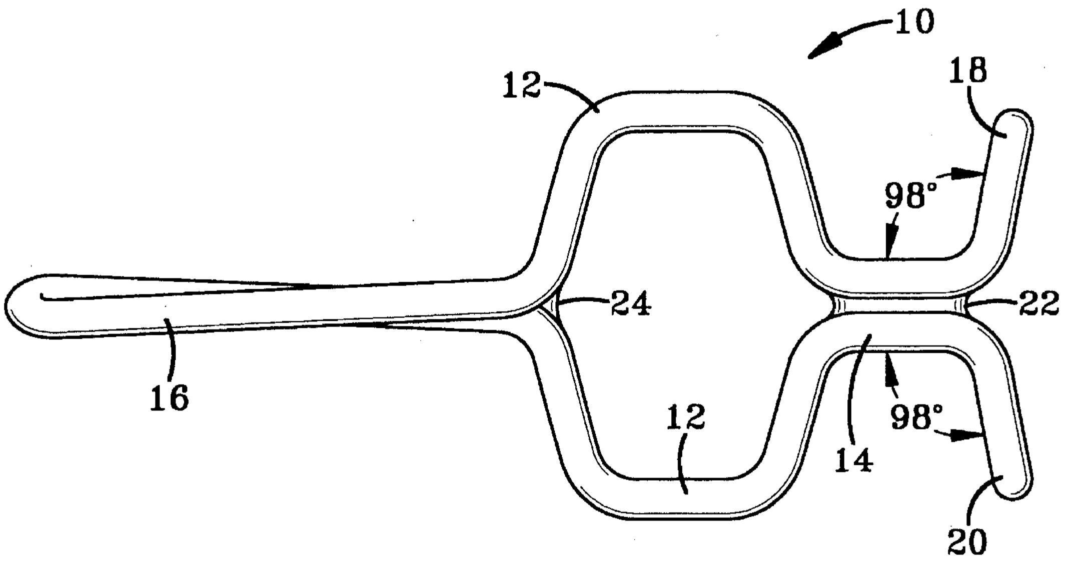
FIG. 1 is a side view illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

The preferred descender 10 is illustrated in FIG. 1. The descender 10 has a central portion or ring 12 which is elongated in shape, meaning the ring 12 is longer in one direction than in all others. This elongated ring 12 has two long sides as a natural result of its elongated shape. A capstan 14 is attached to one long side of the ring 12, extending laterally from the ring 12. A handle 16 extends from the opposite long side of the ring 12 as the capstan 14. The handle 16 is hand grippable in its shape and has a length at least substantially one palm width. By substantially one palm width, it is meant that the length of the handle 16 is equal to the width of the palm of a person having a hand of average size. This dimension is approximately five inches, but this is not the only useable handle length.

The handle 16 preferably is attached at 180° around the ring 12 from the capstan 14, extending preferably in directly the opposite direction as the capstan 14. The handle 16 may be attached at a different place or angled somewhat differently from this preferred direction, but the preferred position and angle have been found to work most effectively due to the predictability of the positioning of the handle 16 for the rappeller using the descender 10.

The descender 10 is formed from a material which is strong, easily formed into the preferred shape, and resistant to fracture upon impact with hard objects. The preferred material from which the descender 10 is made is ⅜th inch diameter stainless steel rod stock. Any less diameter tends to allow sharp kinks in the rope which wear the rope to a greater extent. This rod stock is preferably bent into the preferred shape shown in FIG. 1 and welded at two places. One weld 22 is formed along the length of the capstan 14, and the second weld 24 is formed at the location where the handle 16 attaches to the ring 12.

Figure 2:
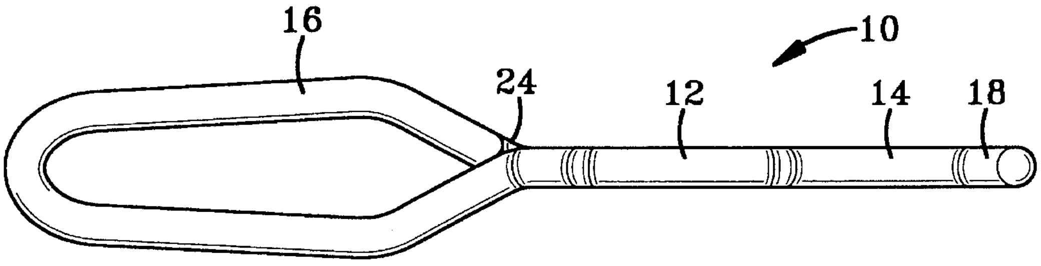
FIG. 2 is a top view illustrating the preferred embodiment of the present invention.

As illustrated in FIG. 2, the handle 16 of the descender 10 is formed in an elongated loop for enhancing the hand grippability of the handle 16. Because of the elongated loop shape of the handle 16, the weld 24 is strategically placed at the position along the rod stock at which the rod stock is pinched together to form the loop of the handle 16. The weld 24 is formed at the pinched region to keep the pinched region from separating, which would alter the shape of the ring 12, when a force is applied to the ends of the ring 12.

A first ear 18 and a second ear 20 extend from the capstan 14. Both ears 18 and 20 are transverse to the capstan 14, and preferably extend in opposite directions. The ears 18 and 20 form an angle with the capstan 14 greater than 90°, preferably approximately 98°.

The ears 18 and 20 have a preferred length which is about two to three times the diameter of the rope to be used on the descender 10. Since most commonly used rope is 7⁄16th of an inch in diameter, the ears 18 and 20 are approximately 1 to 1½ inches in length in the preferred embodiment. This may vary if the descender is to be used with larger rope. The ears 18 and 20 should be limited in length so as not to extend beyond the longitudinal ends of the ring 12, because this excessive length might cause the ears 18 and 20 to interfere with use of the descender 10 or other rappelling devices. It is preferred that a plane which contains the ears 18 and 20 be coplanar with the ring 12, giving the descender 10 a substantially flat profile, enlarged at the handle 16 for improving hand grippability.

The capstan 14 preferably has a length approximately two to three times the diameter of the rope used on the descender. The capstan length is therefore approximately 1 to 1½ inches when used with 7⁄16th inch diameter rope as in the preferred embodiment.

Figure 3:
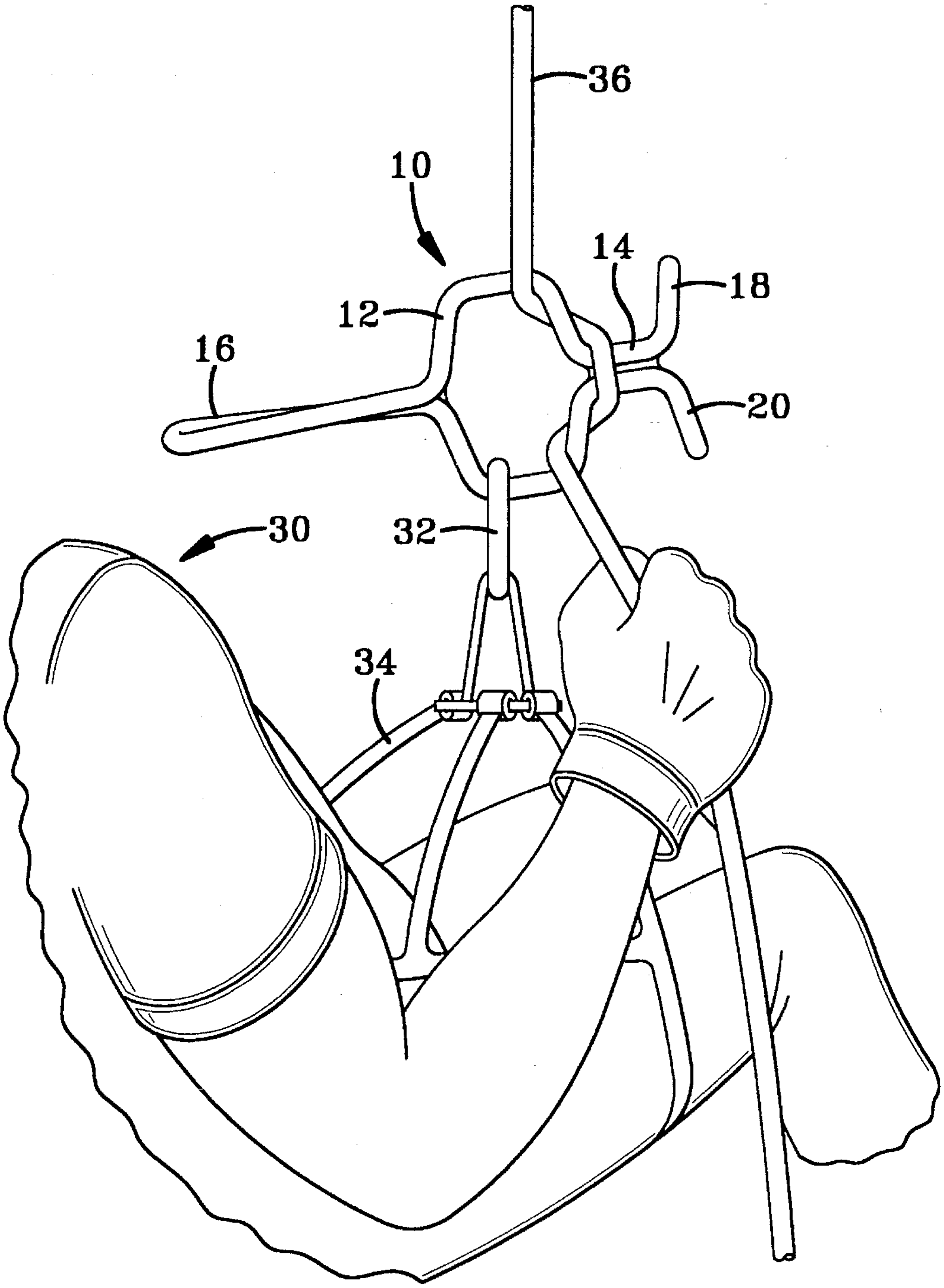
FIG. 3 is a side view in perspective illustrating the preferred embodiment in its operable position.

The descender 10 is shown in its preferred operable position in FIG. 3. A rappeller 30 attaches the descender 10 to his body by a series of conventional devices. A carabiner 32 attaches at one end to the ring 12 of the descender 10 and at its opposite end to a belt or harness 34, which is wrapped around the rappeller 30. A rope 36 extends through the descender 10 in one of many combinations of turns. A simple combination of turns is shown in FIG. 3.

The rope 36 is extended through the ring 12, in one of the simplest manners, by extending a looped portion of the rope through the ring 12, and positioning the loop around the ears 18 and 20 onto the capstan 14. The capstan 14 keeps the portion of the rope looped around the capstan from moving longitudinally along the ring 12. The ears 18 and 20 keep the rope 36 from being displaced from the capstan 14 by physically impeding the loop of the rope 36 from sliding away from the ring 12 and off of the capstan 14.

As the rappeller descends with the descender in its operable position, the overhead part of the rope 36 is tight, extending upwardly from the ring 12. The surface contact between the rope 36 and the descender 10 forms a frictional bond slowing the descent and making the lower end of the rope 36, extending downwardly from the descender 10, substantially more loose and easily gripped by a hand than the top part of the rope 36, as is the case with most conventional descenders. However, the descender 10 has additional characteristics that make it different from conventional descenders.

The elongated shape of the ring 12 maintains the sidewardly directed orientation of the capstan 14 and the handle 16 by keeping the carabiner 32 and the upper, taut end of the rope 36 at opposite, longitudinal ends of the ring 12, as shown in FIG. 3. An elongated ring tends to orient itself with the force-applying carabiner 32 and rope 36 at the farthest points from each other. It is desired that the handle 16 and capstan 14 always be positioned in a specific orientation, which is preferably along a generally horizontal line. Since the forces applied by the rope 36 and carabiner 32 are generally vertical, positioning the handle 16 and the capstan 14 on the long sides of the ring 12 will ensure a generally horizontal orientation of these parts, since the rope 36 will naturally seek one corner (nearest the capstan 14) at one end of the ring 12, and the carabiner 32 will rest in the opposite corner at the opposite end of the ring 12. The handle 16 and capstan 14 extend laterally from the long sides of the ring 12, allowing the descender 10 parts to naturally orient themselves in the position shown in FIG. 3, making those parts, the handle 16 and capstan 14, readily accessible to the rappeller. The confidence the rappeller, especially those rappellers that rappell to rescue people or to perform military maneuvers, gains in knowing that the descender 10 will always be in the same position is very desirable since it increases the safety of the rappell.

The preferred shape of the ring 12 is an elongated, substantially hexagonal polygon, having end widths of approximately two to three times the diameter of the rope. This width is approximately 1 to 1½ inches in the preferred embodiment, and depends upon the diameter of the rope intended to be used in a given descender. (The ring of a descender made for use with larger diameter rope may be made larger in order to accommodate the larger rope.) The substantially hexagonal shape provides two corners at each longitudinal end of the ring 12. The carabiner 32 and the rope 36 tend to rest in opposite corners at opposite ends in their preferred orientation, as shown in FIG. 3 when the descender 10 is in its operable position. This tendency for the rope 36 and the carabiner 32 to rest in these corners provides the predictable lateral location of the capstan 14 and the handle 16 upon which a rappeller 30 can rely.

The elongated shape of the ring 12 keeps the turns of the rope 36 from binding together as the rope 36 slides through the descender 10 during decent since the long sides to which the handle 16 and capstan 14 are attached allow the turns of the rope 36 to spread out along these sides. The capstan 14 keeps the turns of the rope 36 from coming together and knotting. All of these structural features combine to make the frictional bond between the rope and the descender 10 consistent throughout the rappell. The length of the ring 12 also permits the alternative use of multiple turns of the rope 36 through the descender 10, as shown in FIG. 4.

The elongated ring 12 has the additional feature of permitting easy attachment of the rope to the descender 10. A hand is used to push the rope 36 through the ring 12 and the fingers are curled, pushing the rope 36 around the capstan 14 with the fingertips. When the rope 36 is tightened, it reaches the position shown in FIG. 3. This operation can be undergone without removing the descender 10 from its attachment to the rappeller's belt 34. The handle 16 can be grasped during this operation, even with heavy gloves, to aid in holding the descender 10. This ability to grasp the handle, even with heavy gloves, benefits fire rescue personnel substantially.

Figure 4:
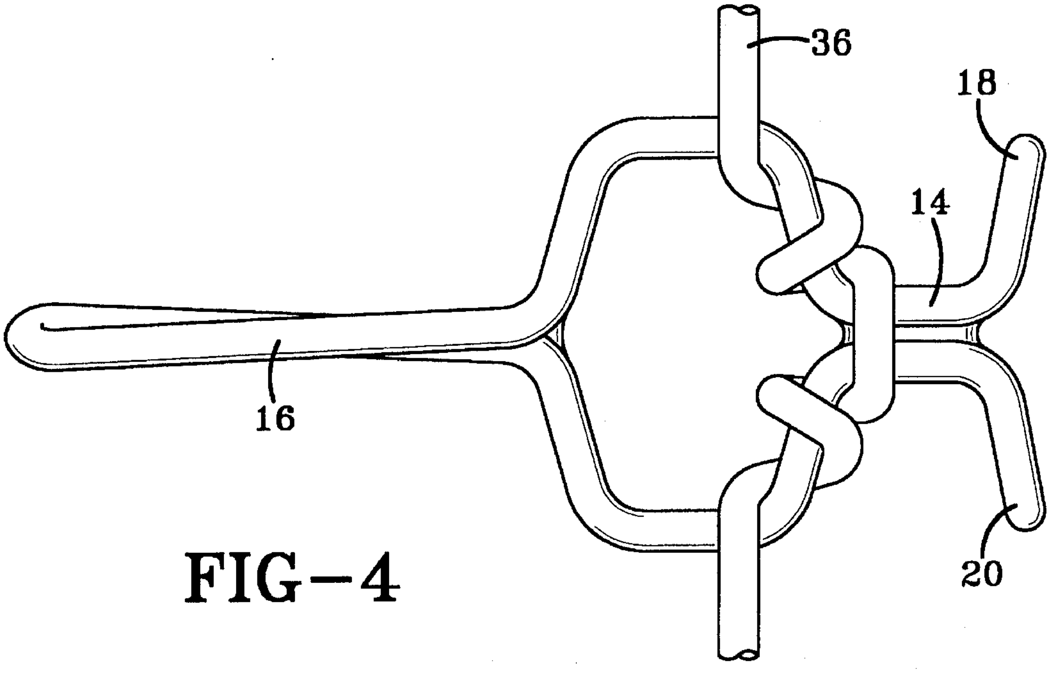
FIGS. 4, 5, 6 and 7 are side views illustrating the invention with rope wound through it showing alternative windings.
Figure 5:
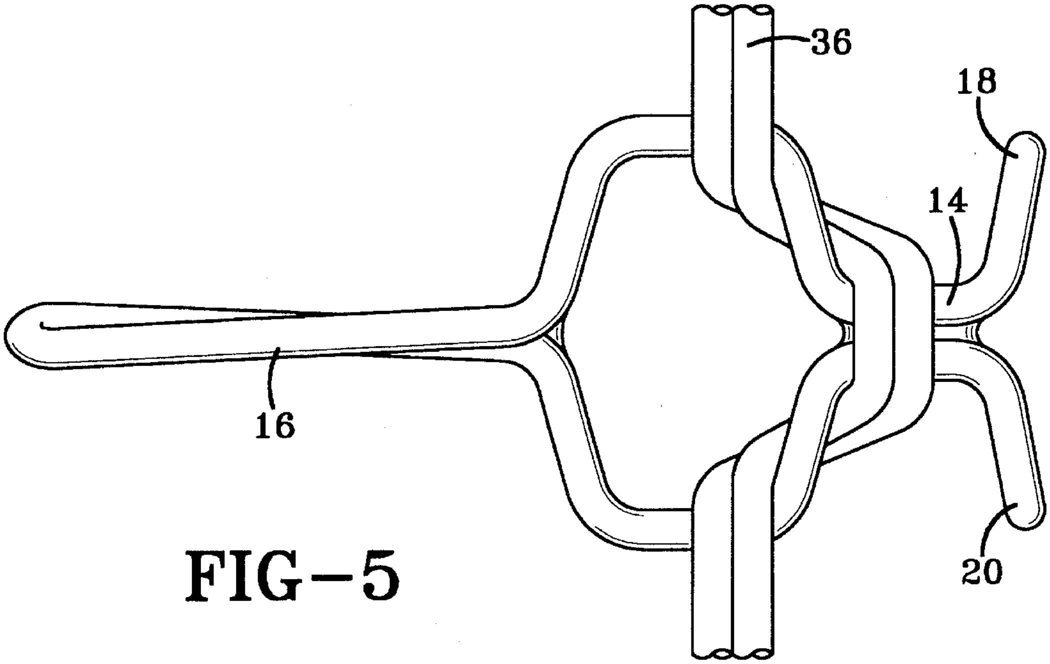

FIGS. 4 and 5 illustrate alternative combinations of turns of rope to effect similar results as in the preferred embodiment illustrated in FIG. 3. The combinations of turns and wraps shown in FIGS. 4 and 5 are for different uses, for example with beginners and rescue personnel, although these combinations are only exemplary of the multiplicity of possibilities.

Figure 6:
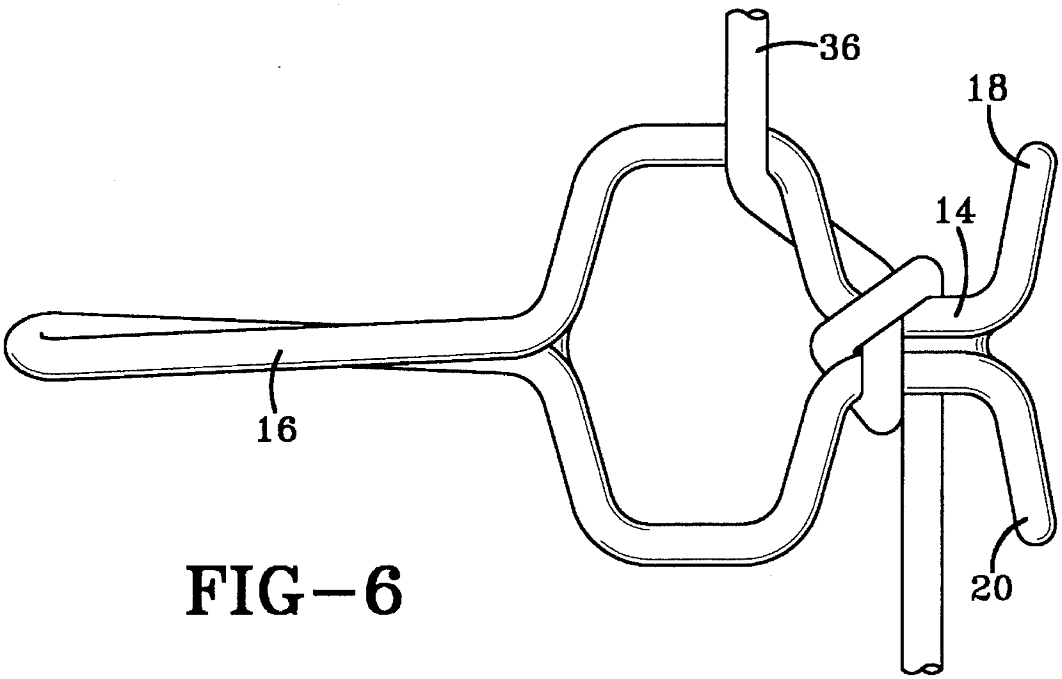
Figure 7:
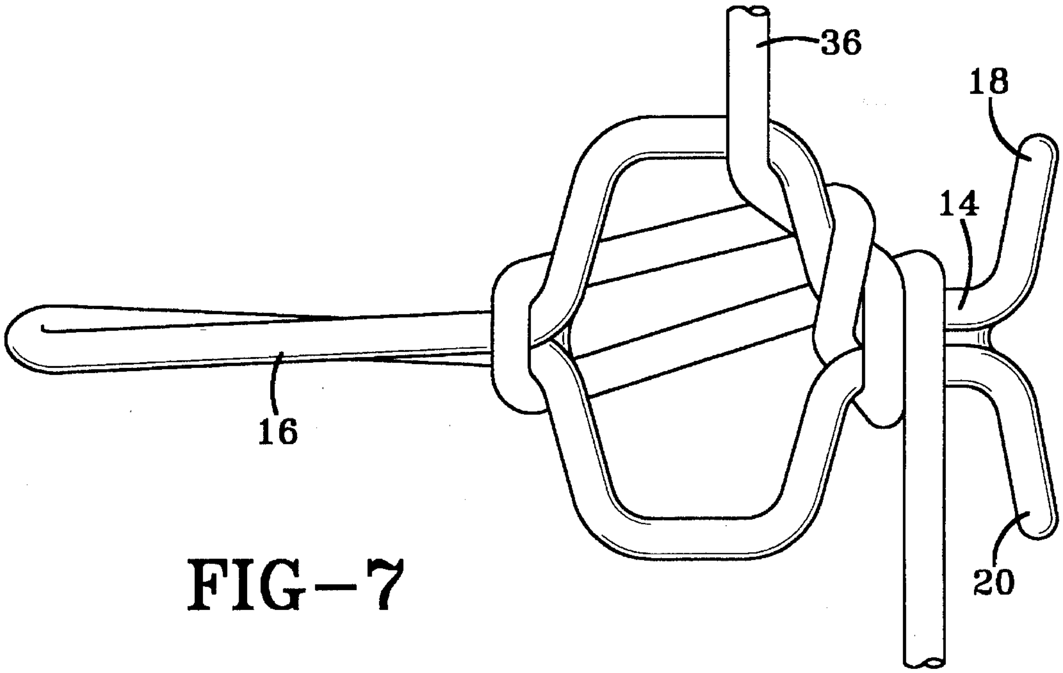

As the rappeller descends he may wish to slow or stop his descent, especially if there is an emergency or other situation in which both hands need to be free. Wrapping the rope 36 around the capstan 14 as shown in FIG. 6 will cause the descent to be slowed by the increased friction, causing a "braking" effect. The rope 36 may, besides being wrapped multiple times around the capstan 14, be wrapped additionally or alternatively around the handle 16 as shown in FIG. 7. The ability to wrap around the handle 16 provides alternative or an additional wraps of the rope which enhances the "braking" ability to slow or even stop the descent and enhances the flexibility of braking for rappellers to use their preferred method. The ability to stop a rappell is of special consideration to rescue workers and military personnel.

The wrappings of the rope 36 as shown in FIG. 6 will create a greater amount of friction than that shown in FIG. 3 due to more turns and the position and tension of the rope 36 which makes wraps of the rope similar to applying a brake. More wraps around the capstan 14 can be made to further slow the descent if necessary. If completely stopping the descent is desired, a plurality of wraps around the capstan 14, in combination with a wrap around the handle 16, may be made, as illustrated in FIG. 7. It is desirable to be able to make these wraps as quickly as possible since time is important when an emergency arises. The operation of wrapping the rope 36 around the capstan 14 may be undergone using only one hand, leaving the other hand free for any other purpose. Because wrapping can be done with one hand, the other hand can also be used to grip the handle 16 which steadies the descender 10, making wrapping of the rope 36 even easier and faster. Once the wrapping is done and the rappeller is stopped, both hands are free for other uses, such as holding a person or using a tool or weapon.

Aluminum rod stock may be used in place of the preferred stainless steel rod stock, with the result being lighter weight. However, aluminum is not preferred due to the need of having either substantially more expensive material to achieve the same strength as the stainless steel, or substantially greater diameter material to achieve the same strength.

The descender 10 shown in FIG. 1 may have a handle 16 which is substantially greater than one palm width in length. This handle may then be propped under a rappeller's arm, while the hand of that same arm is used to hold the lower, more loose end of the rope. This would provide for one-handed control over the speed of the descent and the orientation of the handle. A greater length handle would also provide for having greater leverage when holding it if that is desired. A handle length of six and a half to eight inches has been found to work well for propping under the arm.

The handle 16 preferably lies in a plane which is perpendicular to a plane in which the ring 12 lies, shown in FIGS. 1 and 2. The orientation of the handle 16 as preferred provides enhanced grippability of the handle 16. There is also a twist to the handle 16 in the preferred embodiment which arises from forming the descender 10 from a single rod and pinching the rod together at one place. This twist provides enhanced gripping comfort for the left hand of a rappeller. For a rappeller who prefers to grip with the right hand, the twist of the handle 16 may be oppositely directed as that shown in FIGS. 1 and 2 to give enhanced gripping comfort. The descender shown in FIG. 1, however, will work with all the advantages of the present invention, even when gripped with the right hand, just with slightly less comfort.

The angle of approximately 98° between the ears 18 and 20 and the capstan 14 is designed to provide a "feeding" of rope onto the capstan 14 to make wrapping around the capstan 14 easier. The long sides of ring 12 to which the capstan 14 is attached are also angled at approximately 98° from the axis of the capstan 14. Since ears 18 and 20 are also angled at approximately 98° from the axis of the capstan 14, this structure creates a "funnel effect" resulting from the ears 18 and 20 and the long sides of the ring 12 being angled to direct rope 36 which contacts them to the capstan 14. Therefore, although the length of the preferred capstan 14 is about two to three times the rope diameter, the effective width between the tips of ears 18 and 20 and the side of the ring 12 is approximately three to five times the rope diameter.

The angle that the ears 18 and 20 form with the capstan 14 does not have to be exactly 98°. The guiding principal in deciding upon 98° as the angle is that it is preferred that the ears 18 and 20 and the long sides of the ring 12 be angled greater than 90° from the capstan 14 to provide "feeding", but not so much greater that rope which is wound toward the capstan and contacts one of the ears 18 and 20 of the long sides of ring 12 is not fed quickly down onto the capstan 14. The reason for desiring this quick feeding of rope to the capstan 14 is that friction between the rope 36 and the capstan 14 and between other turns of rope 36 is high at the capstan 14. So when the rope 36 is fed quickly and reliably to the capstan 14, the braking effect of the preferred descender is more consistently high.

The preferred ring 12 is, as stated above, an elongated, substantially hexagonal shape. An elliptical ring would suffice to operate the present invention, although it would not have the advantage that the carabiner 32 and the rope 36 would rest in opposite corners, as is illustrated in FIG. 3. A rectangular ring 12 could also be used having substantially the same advantages as the preferred ring 12, but due to the desire to have the long sides of the ring 12 angled to feed rope to the capstan 14, the substantially hexagonal shape is preferred.

Because the handle 16 is opposite the capstan 14, greater predictability is permitted using the descender 10. When the handle 16 is grasped by the rappeller, he knows the exact position of the capstan 14 with respect to his hand. Therefore, it is easy to wrap the rope 36 around the capstan 14 to apply the "braking" effect by merely grasping the handle 16. The handle 16 also acts as another "capstan" around which the rope 36 may be wound. Wrapping the rope around the handle 16 as shown in FIG. 7 further increases the friction between the rope 36 and the descender 10.

It is possible to have only one ear extending from a capstan, although this would have certain disadvantages. For example, when wrapping the rope around the capstan having only one ear, the feeding effect of the ears would exist only half of the time.

Additionally, it is possible to have a disk attached to the end of a capstan as a substitution for the pair of ears 18 and 20. The effect would be substantially the same as having the ears 18 and 20, especially if the disk has a generally conical shape to provide the feeding that is realized with the preferred embodiment. However, attachment of a disk to the capstan would complicate the manufacture of the present invention, and the flat profile of the present invention would be disrupted by the disk.

While certain preferred embodiments of the present invention have been disclosed in detail, it is to be understood that various modifications may be adopted without departing from the spirit of the invention or scope of the following claims.

I claim:

1. A rappelling descender comprising:

(a) an elongated ring having opposite longer sides and interposed opposite shorter sides;

(b) a capstan attached to a first longer side of the ring; and (c) an elongated, hand grippable handle extending at least substantially one palm width from a second longer side of the ring, opposite the capstan, for clasping with a hand.

2. A descender in accordance with claim 1, wherein the improvement further comprises at least one ear extending from, and transverse to, the capstan.

3. A descender in accordance with claim 2 wherein a first ear extends from one side of the capstan, and a second ear extends from an opposite side of the capstan as the first ear, both ears transverse to the capstan.

4. A descender in accordance with claim 3 wherein both ears lie in a plane that is coplanar to the ring.

5. A descender in accordance with claim 4 wherein each ear forms an angle with the capstan greater than 90°.

6. A descender in accordance with claim 5 wherein the angle is 98°.

7. A descender in accordance with claim 4 wherein the length of each ear is at least twice the diameter of a rope to be used with the descender.

8. A descender in accordance with claim 4 wherein the handle is an elongated loop.

9. A descender in accordance with claim 8 wherein a plane in which the handle loop lies is perpendicular to the plane in which the ring lies.

10. A descender in accordance with claim 3 wherein the ring has an elongated, substantially hexagonal shape.

11. A descender in accordance with claim 1 wherein the descender is made from metal rod stock.

12. A descender in accordance with claim 11 wherein the descender is formed from ⅜th inch diameter stainless steel.

13. A descender in accordance with claim 11 wherein the descender is formed from a single stainless steel rod which is bent and welded into shape.

14. A descender in accordance with claim 10 wherein the descender is formed from aluminum rod.

15. A method of rappelling comprising:

(a) attaching a carabiner to an elongated ring of a rappelling descender, said ring having opposite longer sides and interposed opposite shorter sides;

(b) extending a portion of a rope through the ring;

(c) looping a length of the rope around a capstan attached to and extending from a first longer side of the ring; and (d) clasping a hand around an elongated, hand-grippable handle extending from a second longer side of the ring, opposite the capstan.

16. A method in accordance with claim 15 wherein the method further comprises positioning the hand-grippable handle beneath an arm of a person who is rappelling, and sliding the rope through the descender.

* * * * *